(12) United States Patent
Xuan et al.

(10) Patent No.: US 6,501,047 B1
(45) Date of Patent: Dec. 31, 2002

(54) LASER-SCRIBING BRITTLE SUBSTRATES

(75) Inventors: Jialuo Xuan, Milpitas, CA (US); Zhengda Pan, Newark, CA (US); Chung-Yuang Shih, Cupertine, CA (US); Thanh Duc Nguyen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 7 days.

(21) Appl. No.: 09/713,311

(22) Filed: Nov. 16, 2000

Related U.S. Application Data

(60) Provisional application No. 60/166,636, filed on Nov. 19, 1999, and provisional application No. 60/166,647, filed on Nov. 19, 1999.

(51) Int. Cl.[7] ................ B23K 26/00; B23K 26/14; B23K 26/18
(52) U.S. Cl. ................ 219/121.69; 219/121.68; 219/121.84; 219/121.67
(58) Field of Search ................ 219/121.69, 121.68, 219/121.84, 121.67, 121.85, 121.6; 225/1, 93.5

(56) References Cited

U.S. PATENT DOCUMENTS

| | | | |
|---|---|---|---|
| 4,336,439 A | 6/1982 | Sasnett et al. ........ 219/121 LH |
| 5,609,284 A | 3/1997 | Kondratenko ................ 225/1 |
| 5,728,993 A | 3/1998 | O'Neill ................ 219/121.67 |
| 5,776,220 A * | 7/1998 | Allaire et al. ................ 65/112 |
| 5,783,797 A | 7/1998 | Xuan et al. ............ 219/121.69 |
| 5,826,772 A * | 10/1998 | Ariglio et al. ................ 225/2 |
| 5,837,330 A | 11/1998 | Xuan ................ 427/555 |
| 6,204,474 B1 * | 3/2001 | Xuan ................ 219/121.77 |
| 6,252,197 B1 * | 6/2001 | Hoekstra et al. ....... 219/121.84 |
| 6,259,058 B1 * | 7/2001 | Hoekstra ............... 219/121.75 |
| 6,299,429 B1 * | 10/2001 | Xuan ................ 425/174.4 |

\* cited by examiner

*Primary Examiner*—M. Alexandra Elve
(74) *Attorney, Agent, or Firm*—McDermott, Will & Emery

(57) ABSTRACT

Laser-scribing brittle substrates along a curvilinear path is effected by impinging and moving at least two laser light beam spots along the substrate surface, the first spot preheating the substrate and the second smaller spot heating the substrate to the laser-scribing temperature below the softening temperature of the substrate. Embodiments include forming dual spots employing a crystal material or employing dual fiber optic cables each optically linked to a lens. In another embodiment, three spot lasers spots are formed employing a three-spot diffractive lens, the third spot formed behind the second laser-scribing spot and heating the surface to a temperature lower than the laser-scribing temperature. Embodiments further include laser-scribing substantially circular glass, ceramic or glass-ceramic substrates for magnetic recording media.

19 Claims, 7 Drawing Sheets

LASER-SCRIBING BRITTLE SUBSTRATES

RELATED APPLICATIONS

This application claims priority from Provisional Patent Application Ser. No. 60/166,636 filed Nov. 19, 1999 entitled "THREE-SPOT DIFFRACTIVE LENSE FOR LASER-SCRIBING AMORPHOUS GLASS AND BRITTLE SUBSTRATES", the entire disclosure of which is hereby incorporated by reference herein.

This application also claims priority from Provisional Patent Application Ser. No. 60/166,647 filed Nov. 19, 1999 entitled "CO2 LASER-SCRIBING METHODS FOR CUTTING AMORPHOUS GLASS SUBSTRATES", the entire disclosure of which is hereby incorporated by reference herein.

TECHNICAL FIELD

The present invention relates to breaking sheets of brittle materials using a laser-scribing technique. The present invention has a particular applicability in laser-scribing brittle non-magnetic sheets along curvilinear paths to produce substrates for use in manufacturing magnetic recording media.

BACKGROUND ART

Conventional techniques for cutting a sheet of brittle material, such as a glass, amorphous glass, glass-ceramic or ceramic material, comprises two principal methods. One such method is mechanical-scribing employing a hard device, such as a diamond tip, to create score marks on the surface of the brittle material which is then broken along the score marks. The second of such conventional techniques is laser-scribing, employing a continuous wave laser, such as a $CO_2$ laser, to continuously heat a zone of a brittle material, such as amorphous-glass, similar to a floating window, up to a localized temperature below the softening point of the material, and then immediately quenching the heated body by applying a coolant, such as air or a liquid such as water. The heating-quenching combination will initiate a tiny surface crack that propagates to localize compression-tension stress effects and the sheet of material will finally be broken under external thermal or mechanical stress. A conventional laser-scribing technique is disclosed by Kondratenko in U.S. Pat. No. 5,609,284, wherein an elliptical target area is impinged with a beam of coherent radiation along the intended direction of the crack, while a stream of fluid coolant is directed at a point on the heated surface on the intended line of the crack. Allaire et al. in U.S. Pat. No. 5,776,220 disclose a laser-scribing technique for brittle materials wherein the laser spot has an extremely elongated elliptical shape such that its major axis is greater than 20 mm to enable rapid scribing.

Conventional substrates for use in manufacturing magnetic recording media include various brittle materials, such as glasses, ceramics and glass-ceramics. In order to form a suitable substrate for use in a magnetic recording medium, two circular scribings must be performed with high precision, one defining the outer diameter and one defining the inner diameter. However, current linear laser-scribing techniques for flat panels can not be directly applied in circular scribings for producing magnetic recording media. For flat panel linear laser-scribing, a circular laser light beam is typically reshaped into a beam with a very elongated cross section, as shown in FIG. 1, with a short axis "a" of about 1±0.5 mm, and a long axis "b" of about 30±10 mm. In FIG. 1, "x" represents the scribing direction, "H" represents the scribing heating zone, "Q" represents the quenching zone, "Tsp" represents the material softening point, "PH" represents the preheating zone, "LS" represents the laser-scribing heating temperature and "QT" represents the quenching temperature.

Adverting to FIG. 1, the localized temperature increases from the leading point to the central point where the highest temperature is achieved but below the material's softening point. The purpose for a long beam axis along the scribing direction and raising a temperature profile is to provide preheating of the surface before reaching the scribing/quenching point. Such an elongated beam is not, however, suitable for substantially circular scribing. Although it may be theoretically possible to modify the lens optics to reshape the elongated beam into an elongated curved beam, any such optical design would be extremely complex in order to meet the various requirements of the outer diameter and inner diameter of magnetic recording media. For example, typical magnetic recording media have an inner diameter of about 20 mm to about 25 mm and an outer diameter ranging from 65 mm to 95 mm, e.g., 84 mm. The difficulty in laser-scribing along a curvilinear path is recognized by Kondratenko (in U.S. Pat. No. 5,609,284) who suggests the use of a score or nick having a gradually increasing depth along the cutting line.

Accordingly, conventional practices for cutting brittle substrates for use in magnetic recording media involve the use of diamond tips to induce mechanical stresses. However, the required high tolerances are not fully satisfied by mechanical scribing. Moreover, after mechanical scribing it is necessary to perform extensive polishing and lapping, thereby significantly increasing manufacturing costs.

There exists a need for a method and apparatus for laser-scribing a brittle substrate along a curvilinear path, particularly a substantially circular path. There exists a particular need for an apparatus and methodology for laser-scribing brittle materials, such as glasses, ceramics and glass-ceramics, along substantially circular paths to form substrates for use in manufacturing magnetic recording media.

DISCLOSURE OF THE INVENTION

An advantage of the present invention is a method of laser-scribing brittle materials along a curvilinear path.

Another advantage of the present invention is an apparatus for laser-scribing brittle materials along a curvilinear path.

Additional advantages and other features of the present invention will be set forth in the description which follows and in part will be apparent to those having ordinary skill in the art upon examination of the following disclosure or may learned from the practice of the present invention. The advantages of the present invention may be realized and obtained as particularly pointed out in the appended claims.

Accordingly to the present invention, the foregoing and other advantages are achieved in part by a method of laser-scribing to separate portions of a sheet of brittle material along a curvilinear path, the method comprising: rotating the sheet; impinging a first laser light beam at a first beam energy on a surface of the sheet to form a first laser spot having a first size to preheat the surface of the sheet to a first temperature; and impinging a second laser light beam at a second beam energy on the surface of the sheet to form a second laser spot having a second size, spaced apart from and behind the first laser spot with respect to the rotating direction, to heat the surface to a second laser-scribing temperature higher than the first temperature; and directing a coolant to an area on the surface of the sheet behind the second spot with respect to the rotating direction.

Another aspect of the present invention is an apparatus for laser-scribing a sheet of brittle material into separate portions along a curvilinear path, the apparatus comprising: means for rotating the sheet; a laser source; a coolant source; means for: impinging a first laser light beam at a first beam energy on a surface of the sheet to form a laser spot having a first size to preheat the surface of the sheet to a first temperature; and impinging a second laser light beam at a second beam energy on the surface of the sheet to form a second laser spot, behind the first laser spot with respect to the rotating direction, to heat the surface of the sheet to a second laser-scribing temperature greater than the first temperature; and means for directing a coolant to an area on the surface of the substrate behind the second spot with respect to the rotating direction.

A further aspect of the present invention is a laser-scribing apparatus for separating portions of a sheet of brittle material along a curvilinear path, the apparatus comprising: a source of a coolant; and means for heating a surface of the sheet to a first preheating temperature and to a second laser-scribing temperature greater than the first preheating temperature.

Embodiments of the present invention comprise the use of a crystal material to form first and second laser light beams. In another embodiment of the present invention, first and second laser light beams are formed employing first and second fiber optic cables each optically linked to a lens. In another embodiment, a three-spot defractive lens is employed to form first and second laser light beams in addition to a third laser light beam which impinges the surface to form a third spot between the second spot and the area impinged by the coolant. Embodiments of the present invention include laser-scribing a glass, ceramic or glass-ceramic material to form a substantially circular disk having an outer diameter and an inner diameter for use in manufacturing magnetic recording media. It should be recognized that the embodiments disclosed herein can be employed for scribing straight lines as well as free-shape lines, such as curvilinear lines and substantially circular lines.

Additional advantages of the present invention will become readily apparent to those having ordinary skill in the art from the following detailed description, wherein embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention enables accurate laser-scribing of brittle materials, such as glasses, ceramics and glass-ceramics, along a substantially curvilinear path, such as a substantially circular path. Accordingly, the present invention enables laser-scribing or cutting of brittle materials for use as substrates in manufacturing magnetic recording media with higher efficiency, greater precision and at a reduced cost vis-à-vis mechanical scribing techniques.

In accordance with embodiments of the present invention, dual laser light beams are generated and impinged on a rotating brittle substrate to form first and second spaced apart laser spots. The first laser spot is impinged on the substrate surface at a relatively low beam energy to form a relatively large size spot, typically a substantially circular spot, thereby preheating the surface to a first relatively low temperature. The second laser light beam is impinged on the surface downstream of the first laser light beam with respect to the rotating direction to form a second substantially circular spot, having a size smaller than that of the first laser spot and spaced apart from the first laser spot, to heat the substrate surface to a second higher temperature, i.e., the laser-scribing temperature which is somewhat below the softening point of the particular material. A coolant is then impinged, as by the techniques disclosed in U.S. Pat. Nos. 5,609,284 and 5,776,220, to quickly reduce the laser-scribing temperature to a quenching temperature, thereby inducing the requisite crack initiation and stresses resulting in separation. It was found that the use of dual laser light beams in accordance with embodiments of the present invention enables accurate laser-scribing along a substantially curvilinear path, such as a substantially circular path, thereby enabling the formation of brittle substrates for use in manufacturing magnetic recording media.

Given the disclosed objectives and the guidance of the present disclosure, the optimum preheating temperatures and laser-scribing temperatures can be determined for a particular material. For example, in laser-scribing conventional amorphous glass materials, such as Corning 1737 glass or NSG GD7 glass, a preheating temperature of about 300° C. to about 450° C. and a laser-scribing temperature of about 500° C. to about 650° C. provide suitable results.

Figure 2:
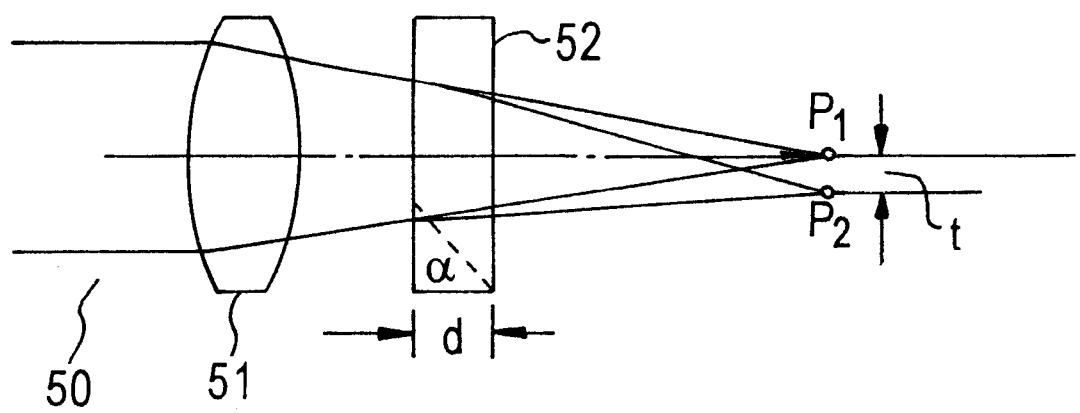
FIG. 2 schematically illustrates an embodiment of the present invention employing a crystal material to form two impinging laser spots.

Any method of delivering the first and second laser light beams to implement embodiments of the present invention can be employed. It was found particularly suitable to employ a crystal material as disclosed in U.S. Pat. No. 5,783,797, the entire disclosure of which is hereby incorporated herein by reference, to generate the first and second laser light beams to obtain preheating and laser-scribing temperatures. As shown in FIG. 2 which substantially corresponds to FIG. 5 of U.S. Pat. No. 5,783,797, a laser light beam 20 is focused through lens 21. A crystal material 22, which can comprise any of various optical crystal materials, such as calcite or quartz, is interposed in the path of the focused laser light beam. Crystal material 22 is selected to have a thickness "d" and crystal-induced optical access angle "α" to create two spaced apart focused points "P1" and "P2" having different energy intensities. Focus points "P1" and "P2" are separated by a distance "t" which is a function of the crystal thickness "d" and the crystal-induced optical access angle "α". The relationship between "t", "d" and "α" can be expressed by the following formula:

$$t=[\tan[\alpha-\tan^{-1}((I_R)^2-\tan^\alpha)]\cdot d=f(\alpha,d) \quad (1)$$

wherein $I_R$ is the refractive index ratio for the particular crystal material.

Figure 3A:
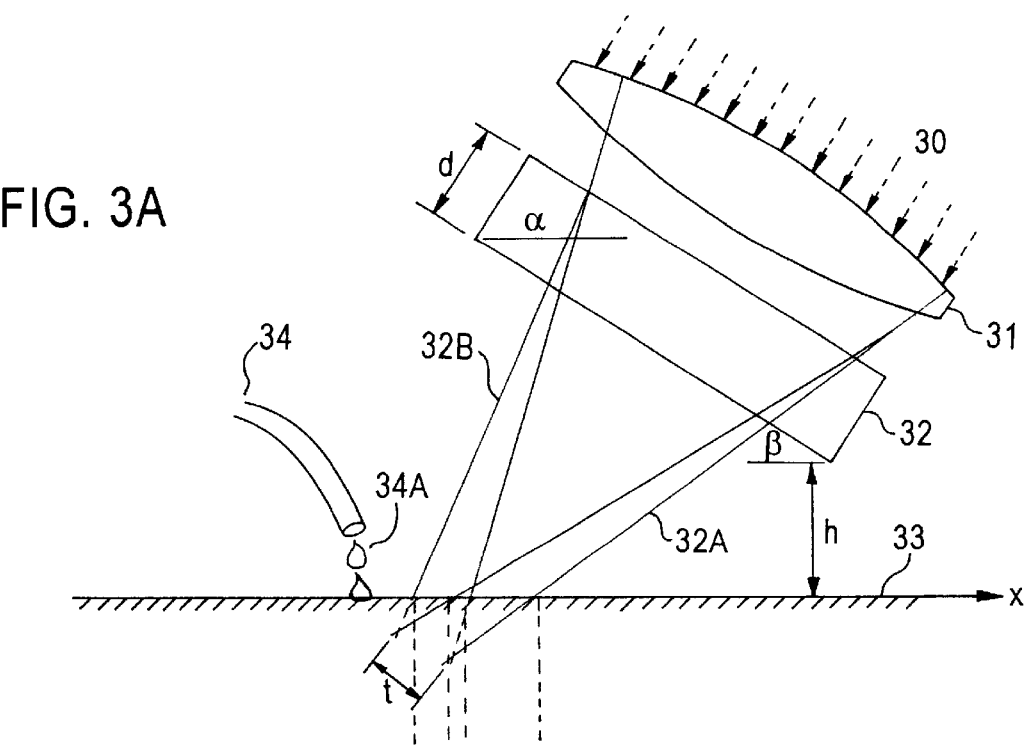
FIGS. 3A–3C schematically illustrate a method in accordance with an embodiment of the present invention employing a crystal material.
Figure 3B:
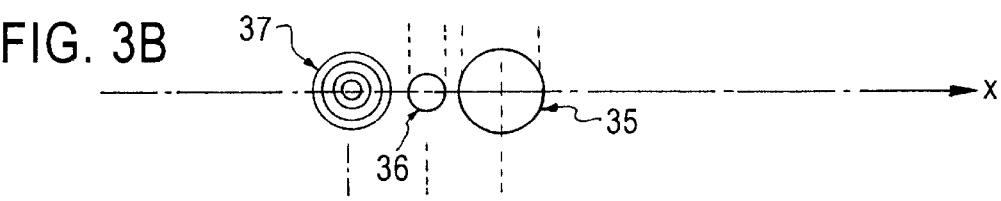
Figure 3C:
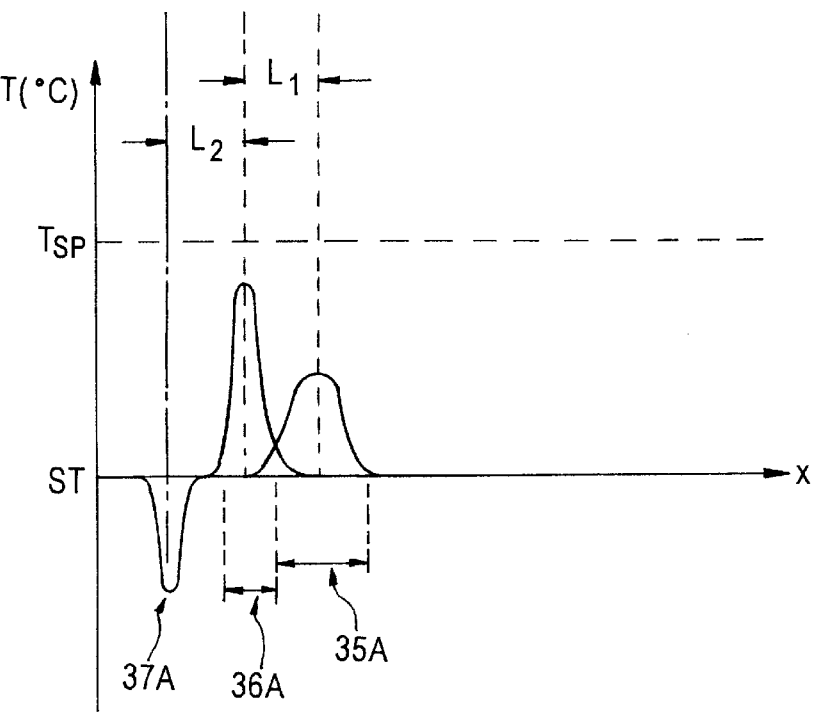

Accordingly, by appropriate selection of the crystal thickness and optical access angle, the final focused beam energy profile can be controlled, thereby enabling accurate control of the distance between the centers of the laser spots. An embodiment of the present invention employing a crystal material to generate dual laser spots on a surface of a brittle material is schematically illustrated in FIGS. 3A–3C. Reference numerals 35A, 36A and 37A represent the preheating temperature, laser-scribing temperature and quenching temperature, respectively. Adverting to FIG. 3A, a laser light beam 30 is passed through lens 31 and then through crystal material 32 having crystal-induced optical access angle "α", positioned at a height "h" above substrate surface 33 and having a tilt angle "β" with respect to substrate surface 33. Crystal material 32 generates two laser light beams 32A, 32B, which impinge on substrate surface 33 forming preheating spot 35 and laser-scribing spot 36 downstream of laser preheating spot 35 with respect to the scribing or rotating direction "x". Laser light beams 32A and 32B are not focused at the surface, but focused beneath the surface and separated by a distance "t" in accordance with formula (1) above. The first unfocused beam 32 impinges on substrate surface 33 to form a relatively large substantially circular laser spot 35 to preheat substrate surface 33 while the second un-focused beam 32B has more concentrated energy and impinges on substrate surface 33 to form a smaller size spot 36. The energy of the second laser beam 32B is controlled so that the local temperature is below the softening point temperature of the material, as shown in FIG. 3C.

Figure 1:
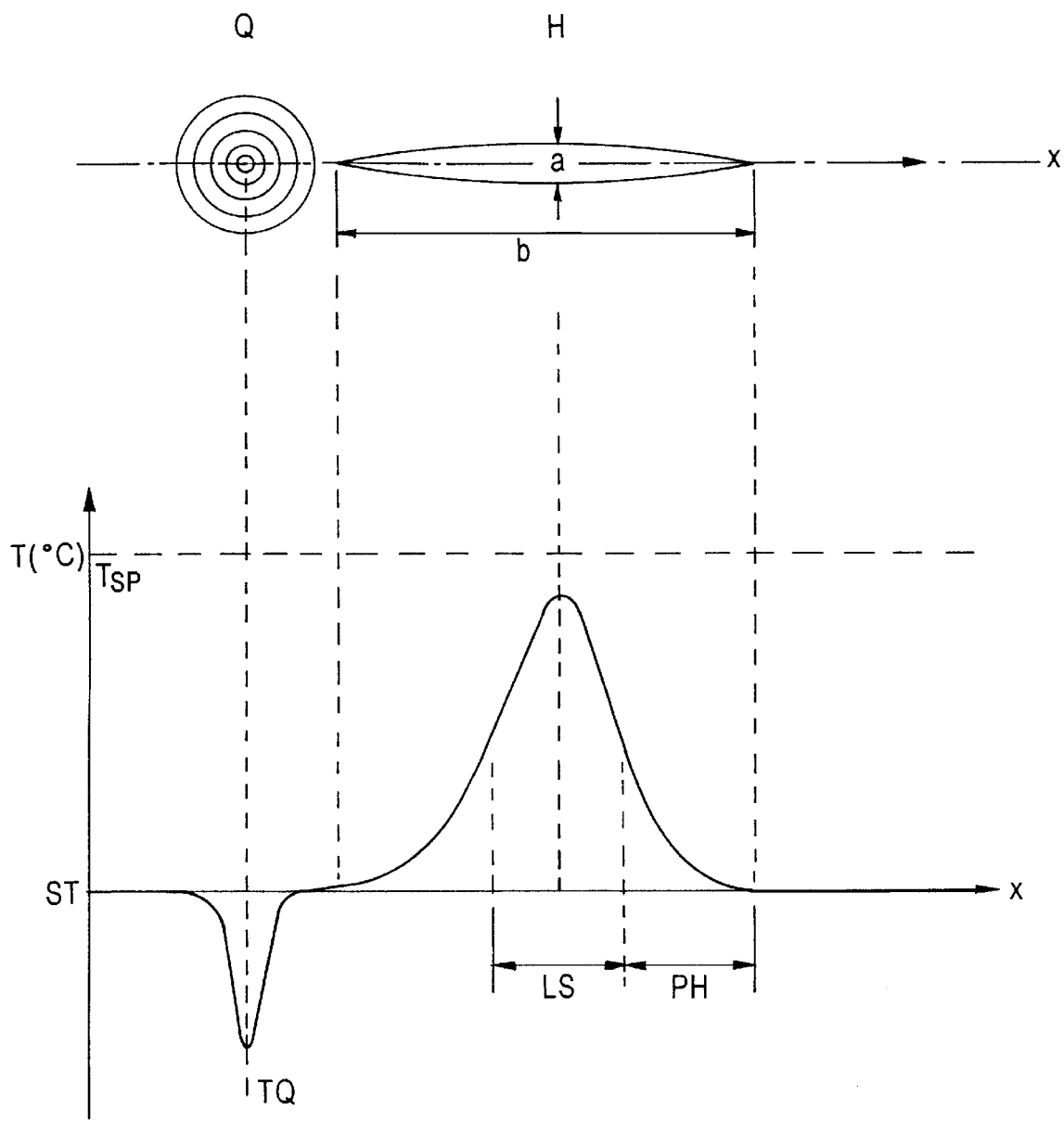
FIG. 1 schematically illustrates a prior art laser-scribing beam shape and substrate temperature distribution.

By adjusting the crystal thickness "d", the crystal-induced optical access angle "α", the crystal height "h" and the crystal tilt-angle with respect to the surface "β", the distance "L1" between the center of the laser preheating spot and the center of the laser-scribing spot can be controlled. The positioning of coolant delivering means tubing 34 for delivering coolant 34a can then be accurately determined at a distance "L2" downstream of laser-scribing spot 36. The illustrated two-spot heating arrangement enables circular cutting vis-á-vis the elongated beam conventionally employed and illustrated in FIG. 1.

The optimum laser spot sizes, temperatures and distances between laser spots can be easily determined in a particular situation for a particular arrangement and particular material. For example, it was generally found suitable to laser-scribe an amorphous glass, such as Corning 1737 glass or NSG GD7 glass, by forming a substantially circular preheating laser spot size having a diameter of about 0.500 mm to about 5.0 mm to preheat the surface of the substrate to a temperature of about 300° C. to about 450° C., and forming a substantially circular laser-scribing spot having a diameter of about 20 microns to about 200 microns to heat the substrate surface to a laser-scribing temperature of about 500° C. to about 650° C. and having a center spaced apart from the center of the laser preheating spot by a distance of about 0.5 to about 1.0 mm.

Figure 4:
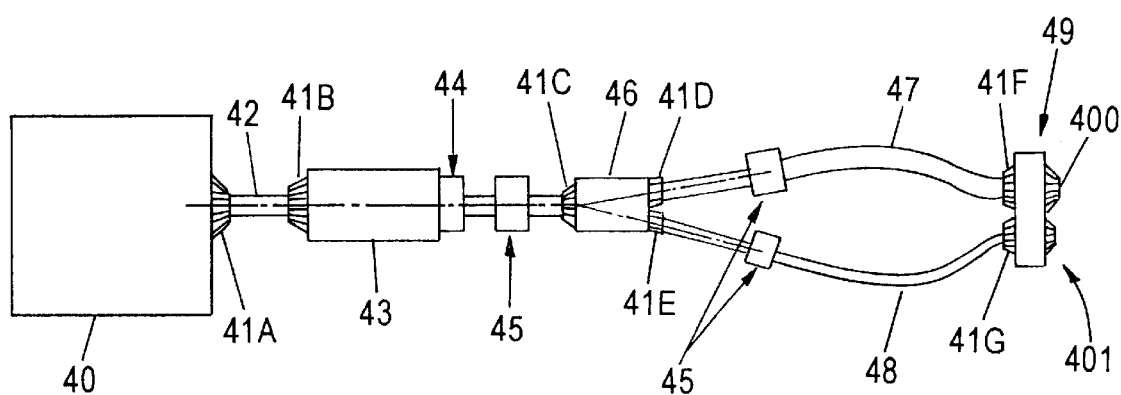
FIG. 4 schematically illustrates a dual fiber optic laser texturing apparatus for use in accordance with another embodiment of the present invention.

In another embodiment of the present invention, dual fiber optic cables, each optically linked to a lens, are employed for impinging first and second laser light beams on a brittle substrate. In this respect, the dual fiber optic laser light beam delivering system disclosed in U.S. Pat. No. 5,837,330 can be employed. The entire disclosure of U.S. Pat. No. 5,837,330 is incorporated by reference herein. FIG. 4 substantially corresponds to FIG. 4 of U.S. Pat. No. 5,837,330 and comprises laser controller 40 connected to laser head 30 having shuttle isolator 44 affixed thereto. The schematically depicted apparatus further comprises attenuators 45, laser fiber coupling 46, first and second optical fiber cables 47, 48, respectively, which optical fiber cables are optically linked to the dual fiber optic assembly 49 comprising first and second microfocusing lenses 50, 51, respectively. Microfocusing lens 50 can have a focal length of about _ mm greater than microfocusing lens 51 and forms a laser spot on a target substrate which is greater than the laser spot formed by microfocusing lens 51. Reference numerals 41A through 41A represent fiber optic coupling connectors while reference numeral 42 represents optic-fiber cables.

Figure 5A:
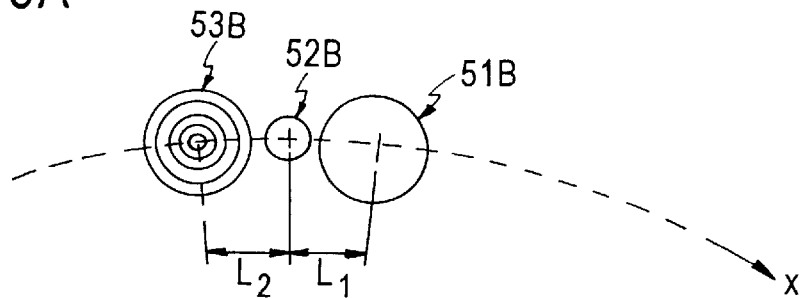
FIGS. 5A–5C schematically illustrate a method in accordance with an embodiment of the present invention employing dual fiber optic cables each optically linked to a lens.
Figure 5B:
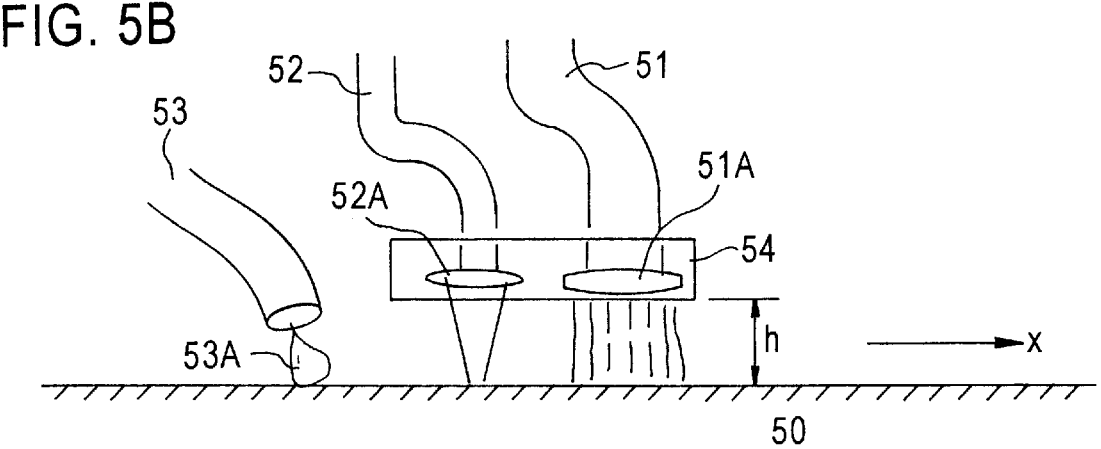
Figure 5C:
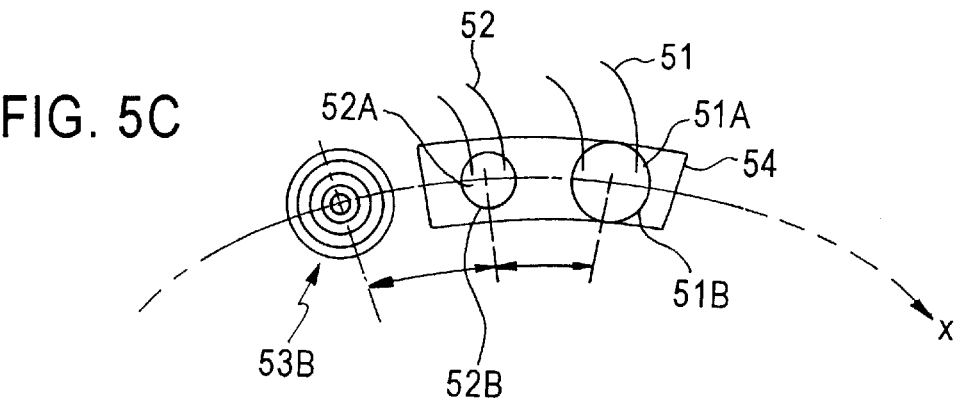

As shown in FIGS. 5A and 5B, incoming laser light beam, e.g., a $CO_2$ laser light beam, is conveyed through first fiber optic cable 51 and second fiber optic cable 52. Fiber optic cable 51 is optically linked to lens 51A and impinges on substrate surface 50 to form a laser preheating spot 51B, the substrate surface being rotated in scribing direction "x". The laser light beam also passes through second fiber optic cable 52 which is linked to lens 52A and impinges on the surface of substrate 50 to form laser-scribing spot 52B, the center of which is spaced apart from the center of laser preheating spot 51B by a distance L1. Lenses 51A and 52A are accommodated in assembly 54 positioned at a distance "h" above substrate surface 50. Coolant tube 53 is positioned to deposit a coolant 53A on the substrate surface 50 downstream of the laser-scribing spot 52B with respect to the direction of rotation "x" forming quenching area 53B, the center of which is spaced apart downstream from the center of laser-scribing spot 52B by distance "L2". FIG. 5C is a top view of the system shown in FIG. 5B wherein assembly 54 is formed as a curved body with a curvilinear shape substantially corresponding to the laser-scribing curvilinear path. The illustrated system is suitable arranged so that the first laser light beam exits lens 51A such that the beam is reduced in energy for preheating purposes, while the second laser light beam passes through lens 52 which has a focus-length larger than the lens height "h" to insure that the beam is defocused so that the local temperature is below the substrate softening point of the material.

In another embodiment of the present invention, a three-spot diffractive $CO_2$ laser lens is employed which produces not only first and second incoming laser light beams but a third laser light beam. A suitable three-spot diffractive lens for use in embodiments of the present invention is a Three-Spot Diffractive $CO_2$ Laser Focusing Lens marketed by Coherent Laser located in California.

A three-spot diffractive lens typically contains diffractive elements that are etched onto a zinc selenide polished surface. The diffractive energy is split into three components, and each component can be precisely focused. In accordance with embodiments of the present invention, the tilt angle "β" of the lens and height "h" can be controlled so that none of the beams is actually focused on the substrate surface, but are defocused under the substrate surface.

The first beam spot provides the preheating function, while the second center beam spot provides the highest temperature for laser-scribing but still below the softening point of the material. The third beam provides a spot size somewhere between the first and second spot sizes to heat the temperature of the surface below that of the laser-scribing temperature. It is believed that the third laser light beam advantageously reheats the line of cut after a blind crack has been produced in the material, thereby increases the depth of the crack.

Figure 6A:
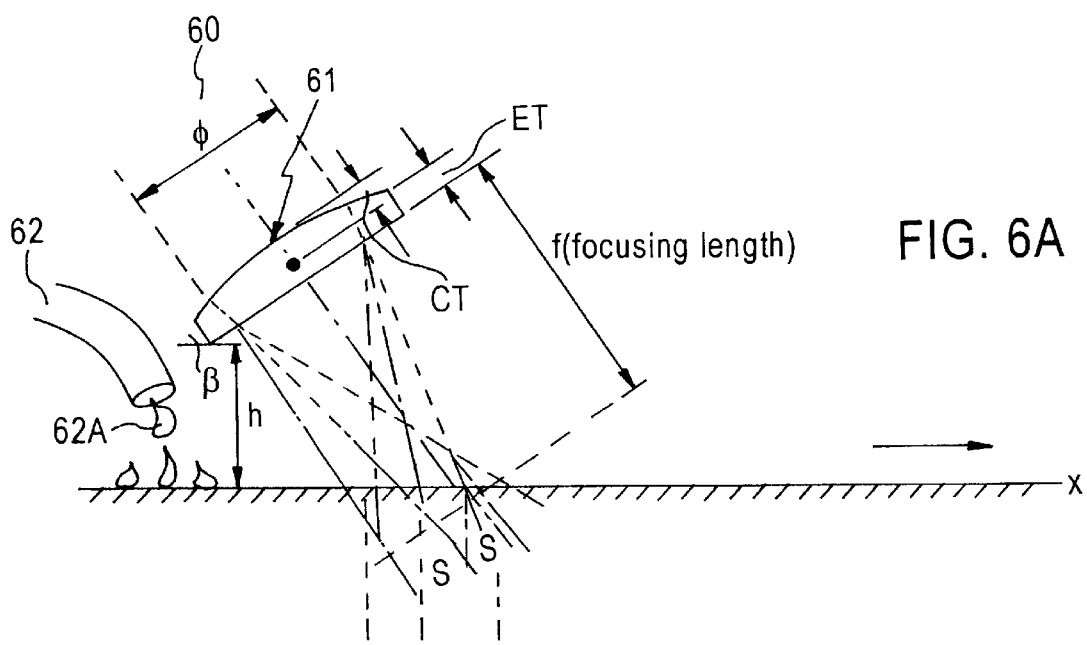
FIGS. 6A–6C schematically illustrate a method in accordance with another embodiment of the present invention employing a three-spot defractive lens.
Figure 6B:
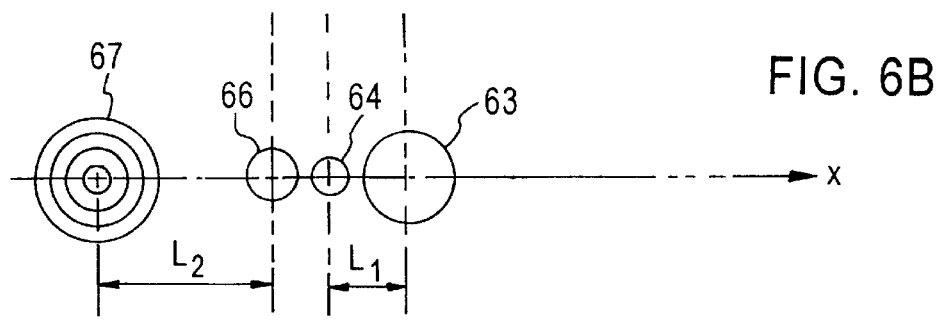
Figure 6C:
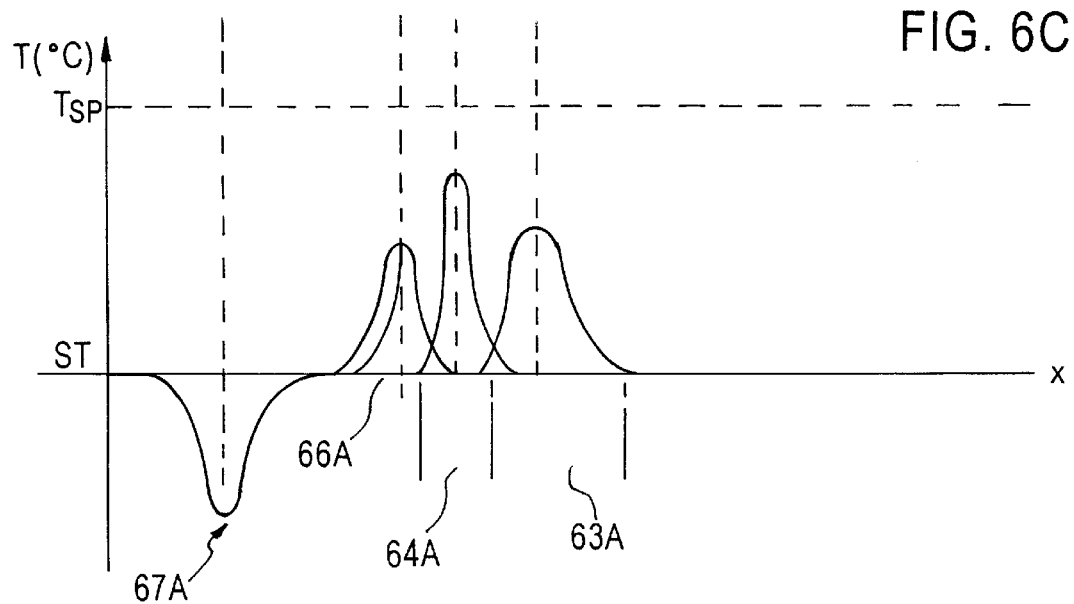

The use of a three-spot defractive $CO_2$ laser lens is schematically illustrated in FIGS. 6A through 6C. Adverting to FIG. 6A, incoming laser light beam 60 passes through three-spot diffractive lens 61 wherein it is split up into three beams. Quenching device 62 delivers quenching liquid or gas 62A. The center distance "L1", shown in FIG. 6B, between the preheating point to the scribing heating point is determined by the lens tilt angle "β", lens focus-length "f", lens height "h", lens diameter "θ", lens center thickness "CT" and lens edge thickness "ET". "L2", the distance from the quenching point to the scribing-heating point, as well as "L1", are parameters which can be controlled by controlling the above-noted parameters of the three-spot diffractive $CO_2$ laser lens. As in the other depicted embodiments, "x" denotes the direction of rotation. With respect to FIGS. 6B and 6C, reference numeral 63 denotes that the laser preheating spot; 63A denotes the preheating temperature; "Tsp" denotes the softening point of the material; "ST" denotes the substrate surface temperature; reference numeral 64 denotes the laser-scribing spot; reference numeral 64A denotes the scribing heating temperature; reference numeral 66 denotes the third laser spot; reference numeral 66A denotes the temperature to which the substrate is heated by the third laser spot; reference numeral 67 denotes the quench area; and reference numeral 67A denotes the quenching temperature.

Figure 7:
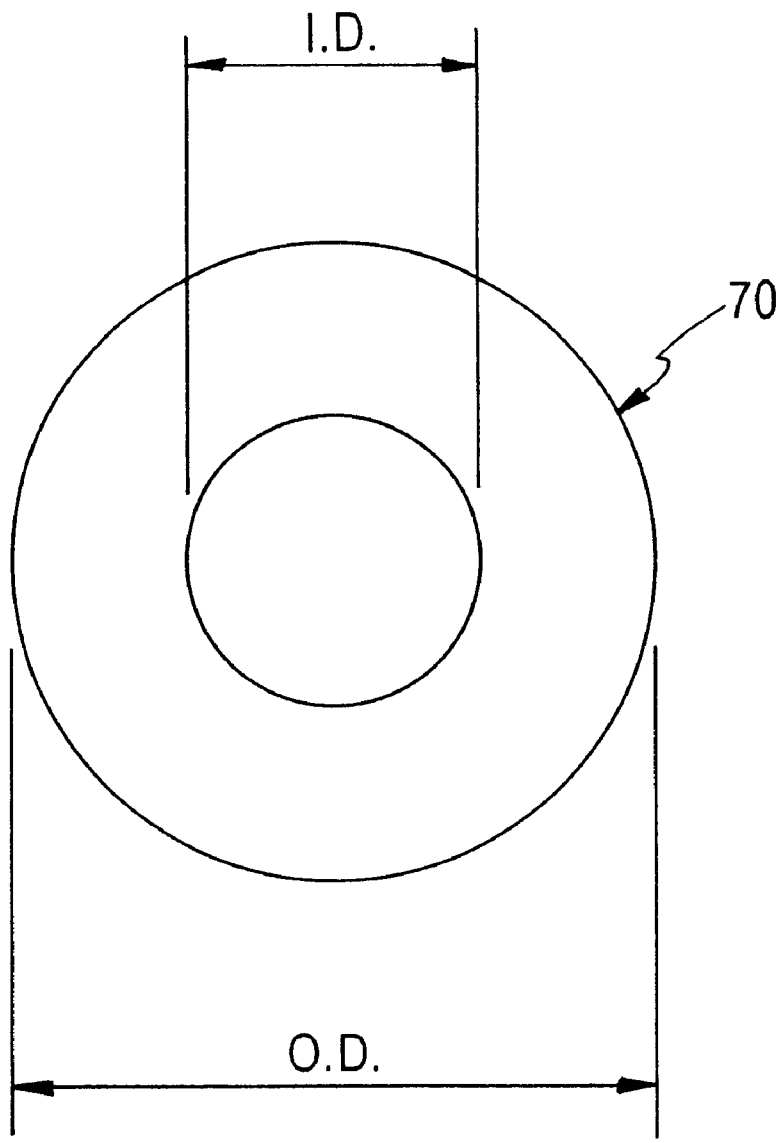
FIG. 7 schematically illustrates a magnetic recording medium substrate produced in accordance with an embodiment of the present invention.

In implementing embodiments of the present invention, a glass, glass-ceramic or glass-ceramic sheet can be laser-scribed from a flat plate, typically having a thickness of about 20 microns to about 50 microns, such as about 31.5 microns. Embodiments of the present invention can be used to accurately laser-scribe a magnetic recording medium substrate 70, as illustrated in FIG. 7, having an inner diameter (I.D.) of about 20 to about 25 mm, and an outer diameter (O.D.) of about 65 to about 95 mm. Typical inner diameters include 20 mm and 25 mm, while outer diameters typically include 65 mm, 84 mm and 95 mm.

In manufacturing magnetic recording media in accordance with the present invention, conventional underlayer or underlayers can be deposited, typically comprising chromium or a chromium alloy, such as chromium-vanadium, chromium-tungsten or chromium-molybdenum. A magnetic alloy layer, such as a cobalt-based magnetic alloy layer, typically containing chromium, tantalum, samarium, niobium, platinum and/or boron, can be employed. A protective overcoat, such as a carbon-containing overcoat, can be deposited on the magnetic layer and a lubricant topcoat deposited on the protective overcoat. The underlayers, magnetic layers and protective overcoats can be deposited in a conventional manner, as by any of various sputtering techniques employing conventional in-line, pass-by sputtering systems. As in conventional practices, the underlayers, magnetic layers, protective overcoats and lubricant topcoats are sequentially deposited on both sides of the substrate.

The present invention can be employed to scribe any of various materials, such as glasses, glass-ceramics and ceramics, either along a substantially straight path or along any of various free-forming curvilinear paths, including substantially circular paths. The present invention enjoys particular industrial applicability in laser-scribing nonmagnetic substrates comprising brittle materials for use in manufacturing magnetic recording media.

Only the preferred embodiment and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method of laser-scribing to separate portions of a sheet of brittle material along a curvilinear path, the method comprising:

rotating the sheet;

impinging a first laser light beam at a first beam energy on a surface of the sheet to form a first laser spot having a first size to preheat the surface of the sheet to a first temperature;

impinging a second laser light beam at a second beam energy on the surface of the sheet to form a second laser spot having a second size, spaced apart from and behind the first laser spot with respect to the rotating direction, to heat the surface to a second laser-scribing temperature higher than the first temperature; and directing a coolant to an area on the surface of the sheet behind the second spot with respect to the rotating direction.

2. The method according to claim 1, wherein the sheet has a thickness of about 20 to about 50 microns.

3. The method according to claim 1, wherein:

the first beam energy is less than the second beam energy; and the first laser spot size is larger than the second laser spot size.

4. The method according to claim 1, comprising:

cutting a first substantially circular disk having an outer diameter from the sheet of brittle material to form a substrate; and forming a magnetic recording medium by sequentially depositing at least one underlayer and a magnetic layer on the substrate.

5. The method according to claim 4, comprising cutting a second substantially circular disk from a central portion of the substrate such that the substrate has an inner diameter.

6. The method according to claim 5, wherein:

the inter diameter is about 20 mm to 25 mm; and the outer diameter is about 65 mm to about 95 mm.

7. The method according to claim 4, wherein the brittle material comprises a glass, ceramic or glass-ceramic.

8. The method according to claim 1, wherein the first and second laser spots are substantially circular.

9. The method according to claim 8, wherein the first and second laser spots have centers spaced apart by a distance of about 0.5 to about 1 mm.

10. The method according to claim 8, comprising impinging a laser light beam through a crystal material to form the first and second laser light beams.

11. The method according to claim 10, wherein the first and second spots have centers spaced apart by a distance, the method further comprising controlling the distance between the centers of the first and second laser spots by adjusting and/or controlling one or more of the crystal thickness, crystal-induced optical access angle, crystal height and crystal tilt-angle with respect to the substrate surface.

12. The method according to claim 8, comprising:

passing a laser light beam through a first fiber optic cable optically linked to a first lens to form the first laser light beam; and passing a laser light beam through a second fiber optic cable optically linked to a second lens to form the second laser light beam.

13. The method according to claim 12, wherein the first and second lenses are mounted in a block having a curvilinear shape substantially corresponding to the curvilinear path.

14. The method according to claim 8, comprising passing a laser light beam through a three-spot difractive lens to form the first and second laser light beams and to form a third laser light beam impinging on the substrate surface to form a third substantially circular spot, between the second spot and the area impinged by the coolant, wherein the third laser light beam heats the substrate to a third temperature less than the second temperature.

15. An apparatus for laser-scribing a sheet of brittle material into separate portions along a curvilinear path, the apparatus comprising:

means for rotating the sheet;

a laser source;

a coolant source;

means for:
impinging a first laser light beam at a first beam energy on a surface of the sheet to form a first laser spot having a first size to preheat the surface of the sheet to a first temperature; and
impinging a second laser light beam at a second beam energy on the surface of the sheet to form a second laser spot, behind the first laser spot with respect to the rotating direction, to heat the surface of the sheet to a second laser-scribing temperature greater than the first temperature; and means for directing a coolant to an area of the surface of the substrate behind the second spot with respect to the rotating direction.

16. The apparatus according to claim 15, wherein:

the curvilinear path is substantially circular;

the first and second laser spots are substantially circular; and the means for impinging the first and second laser light beams comprises a crystal material that separates a laser light beam into the first and second laser light beams.

17. The apparatus according to claim 15, wherein:

the curvilinear path is substantially circular;

the first and second laser spots are substantially circular; and the means for impinging the first and second laser light beams comprises:
a first fiber optic cable optically linked to a first lens; and
a second fiber optic cable optically linked to a second lens.

18. The apparatus according to claim 17, wherein the means for impinging the first and second laser light beams further comprises a curved block containing the first and second lenses.

19. The apparatus according to claim 15, wherein:

the curvilinear path is substantially circular;

the first and second laser spots are substantially circular; and the means for impinging first and second laser light beams comprises a three spot diffractive lens that also forms a third laser light beam impinging the sheet surface to form a third laser spot, between the second laser spot and the coolant impingement area, to heat the surface of the substrate to a third temperature less than the second laser-scribing temperature.

* * * * *